US006237534B1

(12) United States Patent
Schwartz

(10) Patent No.: US 6,237,534 B1
(45) Date of Patent: May 29, 2001

(54) LITTER BOX ASSEMBLY

(75) Inventor: David Schwartz, 6398 Del Cerro Blvd., #4, San Diego, CA (US) 92120

(73) Assignee: David Schwartz, San Diego, CA (US)

( * ) Notice: Subject to any disclaimer, the term of this patent is extended or adjusted under 35 U.S.C. 154(b) by 0 days.

(21) Appl. No.: 09/596,022

(22) Filed: Jun. 15, 2000

(51) Int. Cl.[7] ........................................ A01K 29/00
(52) U.S. Cl. ............................................ 119/165
(58) Field of Search ........................ 119/161, 165, 119/484, 485, 486

(56) References Cited

U.S. PATENT DOCUMENTS

| | | | |
|---|---|---|---|
| 2,795,208 | * 6/1957 | Rasmussen . | |
| 4,021,975 | 5/1977 | Calkins | 52/64 |
| 4,029,048 | 6/1977 | Gershbein . | |
| 4,776,300 | 10/1988 | Braddock | 119/1 |
| 4,788,934 | 12/1988 | Fetter | 119/1 |
| 5,361,725 | * 11/1994 | Baillie et al. | 119/165 |
| 5,448,965 | * 9/1995 | McClure . | |
| 5,769,026 | * 6/1998 | Kohn | 119/165 |
| 5,842,438 | * 12/1998 | Messmer | 119/165 |
| 5,924,383 | 7/1999 | Smith | 119/165 |
| 5,970,914 | 10/1999 | Steil et al. | 119/165 |
| 5,975,017 | 11/1999 | Cameron | 119/165 |

*Primary Examiner*—Thomas Price
(74) *Attorney, Agent, or Firm*—Knobbe, Martens, Olson & Bear LLP

(57) ABSTRACT

A litter box assembly is described that comprises a box for containing litter, having a base, rigid side walls, an opening in one of the side walls, and a removable lid atop the side walls; and a flexible tunnel, preferably made of an accordion plastic. The tunnel allows for the ingress and egress of a small animal, preferably a "so-called" indoor pet such as a cat, and supports the weight of the small animal during its ingress and egress to and from the litter box. The tunnel is preferably suspended above the ground via removable attachments to the opening in the litter box, the to an opening in a residence. The litter box is not fixed in a particular orientation relative to the opening in the residence, even when connected to the tunnel. The litter box is preferably substantially divided, by an interior wall, into a waste chamber for containing litter and an interior passageway. The interior passageway may comprises holes on the floor to allow the passage of litter through the holes during ingress and egress of the animal, but small enough to prevent passage of the feet of the animal through the holes. The rigid side walls of the litter box may also comprise wall holes, which may be covered by overhangs, where the wall holes are of a size to permit the free flow of air and gases into and out of the litter box, and small enough to prevent passage of the animal from the litter box through the holes.

23 Claims, 3 Drawing Sheets

LITTER BOX ASSEMBLY

BACKGROUND OF THE INVENTION

1. Field of the Invention

The invention relates generally to litter boxes, especially litter boxes for household pets, and, more particularly, to litter box assemblies that can be mounted to the exterior of a house or other residence to provide for the ingress and egress of a small animal between the litter box and the interior of the house or other residence.

2. Description of the Related Art

Presently commercially available litter boxes and litter box assemblies are designed to maintain pet waste and litter, especially litter soiled with such waste, within a confined space. They are also optionally designed to, at least to some degree, control the odor of such waste and soiled litter. Nonetheless, presently commercially available litter boxes are deficient in a number of respects.

Many pet owners have so-called "indoor" pets that are domiciled predominantly, or exclusively, indoors and, more particularly, are domiciled inside the home or residence of the owner or owners. These owners often desire to keep the litter box of the pet outside of the residence for one or more of a number of reasons, including, to avoid the odor associated with litter and/or litter soiled with pet waste, to prevent the loss of the space inside the residence that is occupied by the litter box, to prevent excess litter, especially soiled litter, from accumulating near the litter box location of the litter box or along the typical path of the pet to and from the litter box, and other factors However, allowing an "indoor" pet outside to use an exterior litter box often creates undesirable effects including an increased chance that the pet will be lost, stolen, or injured, an increased chance that the pet will be exposed to harsh or unpleasant outdoor or environmental effects such as rain, cold, or wind, an increased chance that the pet will confront other animals, as well as other effects.

To address these problems, there have been created assemblies involving an opening to the outside from the residence, such as an open window, and a mounting for the litter box such that the litter box accessible through the window. To prevent the pet from getting outside of the residence and assembly, baffles have been affixed to the open window of the residence.

There are problems associated with this arrangement, including: the security and weather-resistance of the residence and the litter box assembly are often compromised as there must be an opened window; it is relatively easy for one outside the residence to remove the baffles and the litter box assembly, and to climb through the opened window; the weather resistance of the residence is often compromised when a window is opened; by having the litter box against the open window, the air may readily flow into the house from the litter box, bringing the undesirable odor into the residence.

Other problems are that the litter may get stuck to the paws of the pet, and subsequently may be brought into around the house or residence; and that there are only a limited variety of installations options. For example, it is often not desirable to have the litter box directly mounted against the house, but rather, it is desirable to have the litter box near the house but in a more convenient location. However, when the entrance of the litter box is not directly linked to the opening of the residence, the pet is more prone to escape to the outside entailed the above-mentioned undesirable effects.

Therefore, a need exists for a litter box and litter box assembly that may be placed outside the residence in a variety of convenient or otherwise desirable orientations or locations. A need also exists for a litter box or litter box assembly that will prevent the pet from escaping to the outside. Furthermore, a need exists for a litter box or litter box assembly that will prevent odor or litter and associated waste from entering the house or residence, while allowing the residence and litter box to remain weather resistant, or while allowing the residence and litter box to remain secure against unwanted intrusion.

SUMMARY OF THE INVENTION

A litter box assembly is described that comprises a box for containing litter, having a base, rigid side walls, an opening in one of the side walls, and a removable lid atop the side walls; and a flexible tunnel, preferably made of an accordion plastic. The tunnel allows for the ingress and egress of a small animal, preferably a "so-called" indoor pet such as a cat, and supports the weight of the small animal during its ingress and egress to and from the litter box. The tunnel is preferably suspended above the ground via removable attachments to the opening in the litter box, the to an opening in a residence. The litter box is not fixed in a particular orientation relative to the opening in the residence, even when connected to the tunnel. The litter box is preferably substantially divided, by an interior wall, into a waste chamber for containing litter and an interior passageway. The interior passageway may comprises holes on the floor to allow the passage of litter through the holes during ingress and egress of the animal, but small enough to prevent passage of the feet of the animal through the holes. The rigid side walls of the litter box may also comprise wall holes, which may be covered by overhangs, where the wall holes are of a size to permit the free flow of air and gases into and out of the litter box, and small enough to prevent passage of the animal from the litter box through the holes. Also described is an apparatus for connecting the litter box assembly to a residence opening for purposes of the ingress and egress of a small animal, comprising a tunnel corrugated in a direction perpendicular to it lengthwise axis to permit modification of the length of the tube and to permit flexing of said tube normal to the lengthwise axis, and means for removably affixing the opened ends to, respectively, an opening in a residence; and an opening in a litter box. The floor of the tube is preferably perforated with holes of a size sufficient to allow litter to pass through and insufficient to allow a small animal to pass through. Kits for constructing such litter box assemblies and methods for constructing such litter box assemblies are also described.

BRIEF DESCRIPTION OF THE DRAWINGS

The accompanying figures and drawings are incorporated in and form part of the specification. The accompanying figures and drawings merely illustrate preferred aspects and embodiments of the invention, and are not intended to limit the scope of protection or the proprietary rights afforded by the present application, future applications claiming priority to the present application, and any patent that may issue from such applications. Together with the remainder of the specification, the accompanying figures and drawings serve to fully explain the principles of the invention to those of skill in the art. In the drawings:

DETAILED DESCRIPTION OF THE PREFERRED EMBODIMENT

Figure 1:
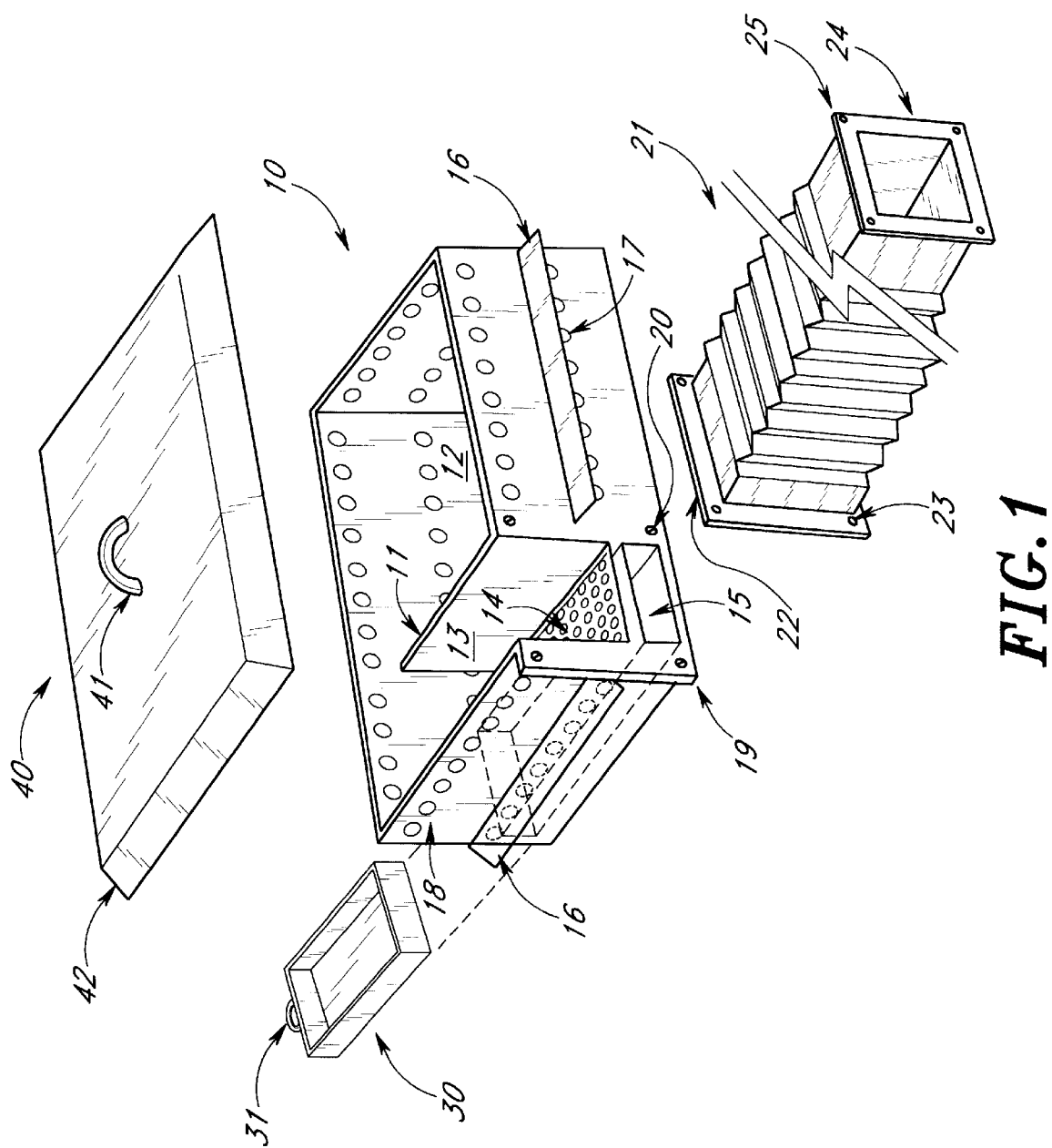
FIG. 1 depicts a perspective, exploded view of a preferred litter box assembly of the invention, in which the litter box, tray, tunnel, and lid are shown.

A preferred litter box assembly of the invention, preferred components of the litter box assembly of the invention, which are each examples and illustrations of certain aspects of the invention, and the methods of making and using the preferred litter box assembly of the invention and the various preferred components of the litter box assembly of the invention, which are also each aspects of the invention, are described.

In accordance with one preferred embodiment of the invention disclosed herein, the litter box assembly comprises (i) a litter box, which optionally is associated with at least one lid and at least one tray, and (ii) a tunnel, which optionally has two ends to allow ingress and egress between the litter box and the interior of a home or other residence.

In accordance with another preferred embodiment of the invention disclosed herein, the litter box assembly comprises (i) a litter box, which comprises a waste chamber and an interior passageway connecting the opening of the litter box to the waste chamber, and which optionally is associated with at least one lid for the litter box and at least one tray under the litter box, and (ii) a tunnel, which optionally has two ends to allow ingress and egress between the litter box and the interior of a home or other residence.

In accordance with one preferred embodiment of the invention disclosed herein, the litter box assembly comprises (i) a litter box, (ii) a tunnel, which optionally has two ends to allow ingress and egress between the litter box and the interior of a home or other residence, and (iii) an opening in the home or other residence. The tunnel is preferably made of a durable accordion plastic, such that it is readily suspended above the ground on the exterior of the home or residence and on the exterior of the litter box, via removable attachments to the opening of the litter box on one axial end and the opening of the home or residence at the opposite axial end. The tunnel preferably has holes in the floor to permit litter to fall to the ground on the exterior, but not to allow the animal to fall. Such fallen litter, especially soiled litter, is ready collected by the owner, and neither the litter nor the odor it emits tend to enter the interior of the home or residence.

As used herein, the term "litter box" refers to a construct in which a small animal, typically a household pet, emits waste (for example, defecates and/or urinates) on a regular basis. Such a litter box is generally constructed to retain an absorptive material, litter, to absorb the waste. Numerous materials are commercially-available to serve as litter, no single material or supplier of litter is preferred for use with the invention.

As used herein, the term "small animal" most typically refer to a mammal weighing more than approximately one pound and less than approximately 40 pounds, more preferably more than approximately five pounds and less than approximately 20 pounds, and most preferably more than approximately ten pounds and less than approximately fifteen pounds. This term may also refer to reptiles, especially those more than approximately one pound and less than approximately 20 pounds. This term most preferably refers to domesticated animals, such as for example cats and dogs, especially those that are domiciled inside the home or residence of the human owner.

The litter box portion of the disclosed assemblies are preferably constructed of a durable, weather-resistant material. Such material preferably comprises wood, metal or plastic and is most preferably a plastic. The most preferred plastics include polymeric plastics such as polyurethane or polyethylene. According to such preferred embodiment, the litter box may be constructed via any conventional plastic hot or cold-molding technique. The litter box is preferably sufficiently large to accommodate a small animal, especially a pet, and most especially a cat, seeking to evacuate bodily fluids and solids, that is, waste, as well as the litter necessary for sanitary absorption of the waste.

One litter box assembly preferably comprises a ventilated litter box with a single opening for ingress and egress, and optionally having a waste chamber connected to the opening via an interior passageway, said chamber and passageway form by a separating wall interior to the litter box, and a two-ended entranceway tunnel removable attached at one end to the opening of the litter box. The other end of the tunnel may be removably-affixed directly to any portion of the exterior of a residence, provided the tunnel is sufficiently sturdy to support the weight of the tunnel and of the small animal while in use; the other end may be removably-affixed to the litter box. The tunnel provides ingress and egress for the pet from the residue to the litter box.

The tunnel may be removably affixed to the opening in the residence in any conventional manner, including through the use of tacks, glue, nails, screws, Velcro®-type connectors or the like. Preferably, however, a set of metal or high-tensile-strength plastic brackets is employed. Specifically, a first end of the tunnel that is affixed to the opening of the residence is preferably constructed to affect a weather-resistant attachment to the exterior of the residence via a mounting bracket. Preferably, the mounting bracket is a "U"-shaped metal bracket with one, two, three, or four slots to receive one or more collapsed ridges of the accordion tunnel. To employ such a bracket, preferably bolted permanently to the exterior of the residence, the first accordion ridge of the tunnel is collapsed, placed within the slot of the bracket, and the bracket is then slid over the collapsed accordion ridge, secured in place to affix the tunnel to the opening in the residence and provide a weather-resistant seal, by an additional weight or, alternatively, by its own weight.

The opposite axial end (the second end) of the tunnel may be removably affixed to the litter box in like manners, and, as with the first end of the tunnel, is preferably affixed via a set of brackets.

The chamber is sufficiently rigid to provide structural integrity under the forces necessarily exerted by use and cleaning. The chamber, alternatively, may be mounted with specially-designed or standard brackets, as described above, directly to an exterior wall, door or window of a residence, over an existing pet door, a hole cut in a windowpane, or any other opening, as preferred by the user. This variety of installation options allows the assembly of the invention to be used with minor exterior alteration, and allows the residence to remain locked and secure.

The litter box is preferably covered by a removable lid that may be removed for ease of cleaning and/or removal of deposited pet waste and/or soiled litter. To prevent escape of the small animal, the lid is not capable of being opened from within by forces typically exerted by the small animal.

Alternatively, the lid and litter box are constructed so that the lid may be locked atop the litter box via any conventional removable locking means, for example, a padlock, from the outside of the assembly for greater security.

In addition to being capable of being removably affixed to the exterior of a residence, preferably directly with brackets as described, the litter box may alternatively be removably affixed to the residence via a flexible passageway tunnel. This tunnel allows the device to be placed on a variety of surfaces or at a variety of distances and orientations from or with respect to the opening of the residence. The tunnel also prevents the pet from accessing the exterior of the residence and the litter box assembly, that is, to the outside. For example, the litter box assembly does not have to be restricted to being directly in front of the opening of the residence and/or on the same level. The tunnel is flexible so that it can accommodate a wide variety of more preferable angles, orientations and/or heights relative to the residence and, particularly, to the opening of the residence utilized for purposes of affixing the tunnel of the litter box assembly.

Preferable, the tunnel is constructed of a durable, weather-resistant material and is expandable. Most preferable, it is constructed as an accordion shape out of the following dense plastics: Such material is preferably wood, metal or plastic and is most preferably, plastic. The most preferred plastics include polymeric plastics such as polyurethane or polyethylene. Preferable, the major portion of the tunnel passage is constructed as an accordion plastic, which is sufficiently strong to support the weight of a pet passing through, yet retaining some measure of flexibility. According to such preferred embodiment, the litter box may be constructed via any conventional plastic hot or cold-molding technique.

The floor of the accordion portion of the tunnel is preferably perforated with floor holes. Such floor hole may be of uniform or varying size and are preferably about one sixteenth, one eighth, ¼, ½, ¾, 1, 1¼, 1½, 1¾, or 2 inches in diameter, and most preferably are about ¼ in diameter. These holes serve as a rain-resistant ventilating mechanism, 258 and preferably allow litter, especially soiled litter, to fall to the ground, below the suspended tunnel, when the pet passes between the litter box and the interior of the residence.

An end portion of the tunnel, typically on the end that attaches to the residence, is rigid and is preferably constructed of a non-perforated plastic. This portion of the passage may be inserted from the exterior of a residence through a wall or door to the interior of the residence. This portion may also be cut, or perforated so as to be more easily cut, to an appropriate length by the user to account for the variety of widths of possible openings.

The litter box is preferably ventilated by means of holes that are sufficiently large to allow air to enter and warm gasses to escape, yet sufficiently small to keep a pet from escaping. Such holes may be of uniform or varying size and are preferably approximately ¼,½,¾, 1, 1¼, 1½, 1¾, 2, 2¼, 2½, 2¾, or 3 inches in diameter, and are most preferably about 1½ inches in diameter. The holes are preferably positioned at two levels in the chamber to utilize the rising and falling of outdoor air, and to facilitate the escape of rising gasses and odors within the chamber. These holes are preferably protected from rain or other outside matter by overhangs which are sufficiently extended to allow the device to resist the entry of rain or other outside water that is directed at it at an angle or horizontally, such as may occur in a storm or when being sprayed with a hose for exterior cleaning purposes. Such overhangs or awnings are of a sufficient size and variety to effectively protect the above-mentioned holes. Furthermore, the holes may preferably be covered with fine screens to prevent the entry of undesired particles, for example, wind-blow debris, cut grass, etc., or insects into the litter box.

The bottom of the interior of the litter box is preferably smooth and may be curved at the sides to facilitate easy removal of pet waste or litter by scooping or by pouring. The bottom of the chamber is preferably designed and intended for direct deposit of litter and waste thereon, and may have a non-stick coating for easy disposal of pet waste. Alternatively, a tray may be placed on the bottom for this purpose. The entrance to the main waste chamber forms a short interior passage which preferably has holes in the floor to allow litter stuck to a pet's feet to fall through as a pet enters or exits the litter box. Beneath the entry floor of the litter box may be placed or affixed, a tray to collect fallen litter and which may be conveniently removed by the user without removing the assembly, for disposal of waste.

EXAMPLE

The following example is meant to illustrate a specific, preferred embodiment of the invention, and is not meant to limit the scope of protection or the proprietary rights afforded by the present application, future applications claiming priority to the present application, and any patent that may issue from such applications. Together with the remainder of the specification, the accompanying example serves to fully explain the principles of the invention to those of skill in the art.

Referring to FIG. 1, a litter box assembly 10 according to the present invention comprises an interior passageway 13 leading to a waste chamber 12, separated from the entryway 13 by interior wall 11. The floor of the entryway is preferably perforated with floor holes 14, which serve to allow litter or other debris to fall from the small animal's feet as it enters or exits the litter box 10. The litter that falls through these holes 14 is caught by optional tray 30 which fits into optional tray slot 15. Tray 30 can be easily removed for cleaning from slot 15 by pulling out from the back by tray handle 31.

Although not a particularly preferred embodiment of the invention, the litter box may be mounted directly to a residence, without the tunnel, using mounting holes 20, which are drilled through flange 19 and the chamber wall. The litter box may, and preferably is, also be connected to a residence via flexible suspended tunnel 21. The litter box 10 can be covered with lid 40, which is removable only from the exterior, and is also capable of being locked from the exterior, using locking mechanisms not shown in FIG. 1.

The passageway 13 shown in FIG. 1, is wide enough and tall enough to accommodate a small animal, such as a cat, desiring to access or use the litter box 10. Likewise, the waste chamber 12 is preferably sufficiently large to comfortably fit the animal, along with absorbent litter and pet waste. The waste chamber bottom is preferably smooth and is curved at the juncture of the floor and rigid side walls so as to facilitate removal of pet waste and litter deposited thereon, by conventional methods such as by scooping or pouring. The bottom of the waste chamber 12 is intended for direct deposit of litter and waste thereon, and preferably comprises a non-stick coating for easy disposal of pet waste.

The litter box 10 is ventilated by means of lower holes 17 and upper holes 18. These holes are sufficiently large to allow air to enter and warm gases to escape, yet sufficiently small to keep a pet from escaping. These holes are placed around the perimeter of the litter box, with the exception of the area directly adjacent the opening in the wall of the litter box. One objective of placing two levels of holes in this embodiment of the litter box, namely lower holes 17 and upper holes 18, is to utilize the rising and falling of outdoor air, and to facilitate the escape of rising, relatively warmer gasses and odors within the chamber. These holes are preferably cove by fine mesh screens to prevent the entry of unwanted debris or insects into the litter box. one preferred screen material is nylon mesh, to prevent the oxidation that may otherwise occur due to atmospheric humidity; other screen materials include metal meshes such as aluminum mesh and iron mesh or varying gages.

The lower holes 17 are preferably protected from rain and/or unwanted sunlight by lower overhangs 16, which are sufficiently extended to allow the device to resist entry of water that is directed at the litter box substantially horizontally, such as may occur in a storm or when being sprayed with a hose for exterior cleaning. Likewise, the upper holes 18 may be protected by like overhangs, or as shown in FIG. 1, may be protected by upper overhangs 42, which are formed by the edge of the lid 40. The upper overhangs 42 may alternatively attached to the exterior of the litter box in the same manner as the lower overhangs 16, to perform the same function.

Figure 2:
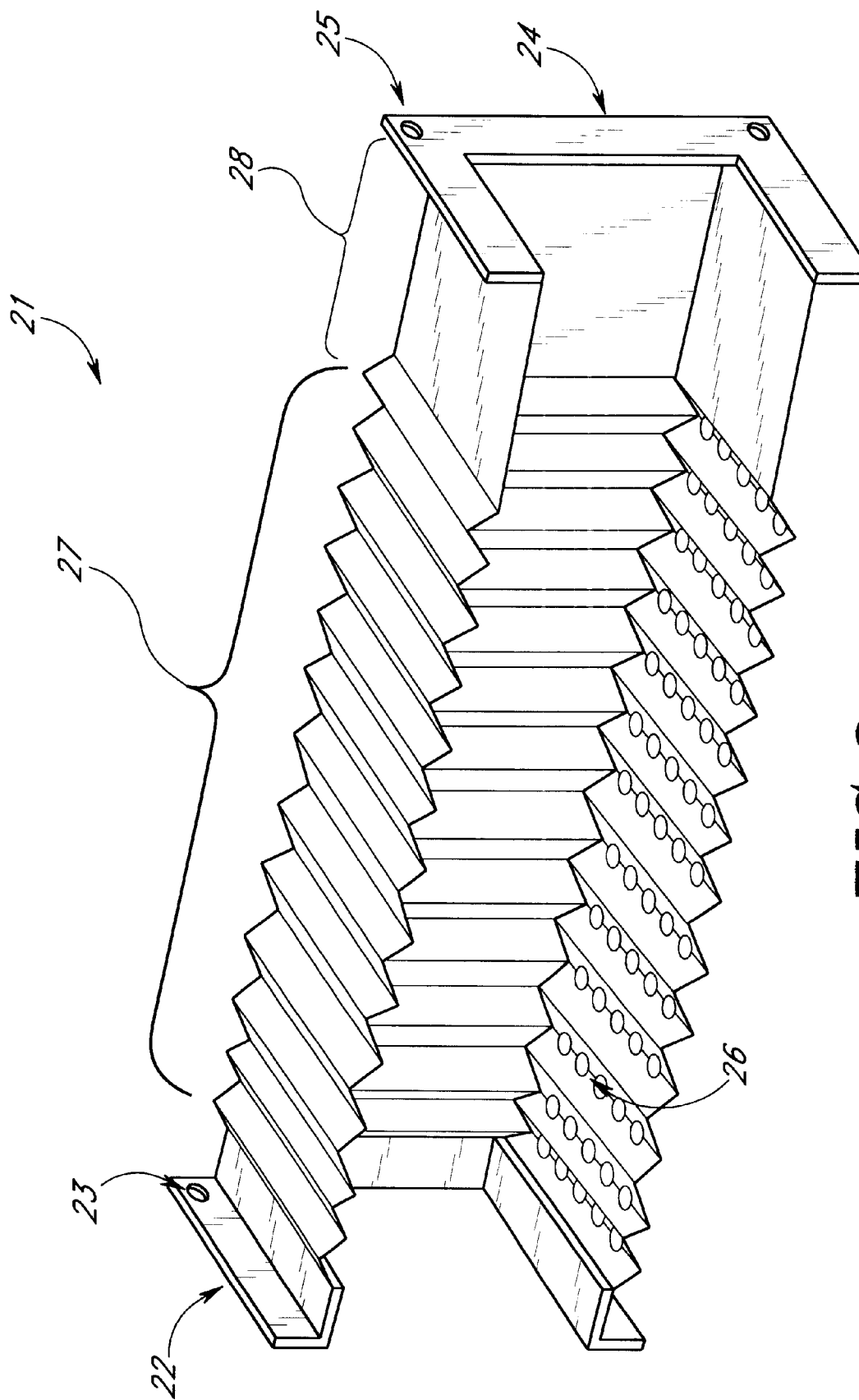
FIG. 2 depicts a cutaway, perspective view of the tunnel of a preferred litter box assembly of the invention in which the tunnel and floor holds are shown.

FIG. 2 depicts a cutaway side view of a partially, axially extended flexible tunnel 21 which is also shown in FIG. 1. The side 22 of the tunnel 21, as shown in FIG. 2, represents the side that would preferably be removably attached to the litter box, while the right side would be removably attached to the opening in the residence. For clarity purposes, the litter box end will subsequently be referred to as the exterior end of the tunnel 21, while the residence-connecting end will be referred to as the interior end. The purpose of this tunnel is to allow the litter box to be placed in a variety of locations exterior of the house, while still allowing the pet to reach the litter box 10 directly from the inside of the residence, without being able to escape to the outside. Using this flexible tunnel 21, the litter box 10 can be placed at various distances and angles from the residence opening, as preferred by the user. The majority of tunnel 21 is constructed of accordion plastic, which is sufficiently rigid to support the weight of a pet passing through it, yet sufficiently flexible to allow the litter box 10 to be placed in a variety of angles from the residence.

The litter box side of tunnel 21 is shaped with an exterior flange 22, with tunnel exterior mounting holes 23 to be used in connection with litter box mounting holes 20. Moving from the exterior end toward the interior end, the tunnel 21 is flexible for a number of feet along the flexible portion 27, giving it the capability of being expanded or contracted to a desired length and/or flex to the desire angle or orientation. At the interior end of the tunnel, the plastic is smooth and more rigid for a short distance referred to as the rigid portion 28.

This rigid portion 28 may be inserted from the exterior of a residence through an opening such as in a wall, to the interior of a residence. Interior flange 24 is equipped with interior mounting holes 25 to be used for affixing to the inside wall of an opening in a residence. For ease of installation purposes, the user will create an interior flange by folding back the plastic, after the plastic has been cut to the proper length and inserted through the opening in the residence. Of course, this means of mounting does not limit the invention from other ways of attaching the tunnel 21 to the interior of the residence.

The floor of the tunnel 21 is preferably perforated with tunnel holes 26 along the flexible portion 27. Two objectives of the holes 26 of this embodiment are that they provide additional ventilation to the tunnel, and that they facilitate the falling of litter stuck on a animal's feet, preventing that litter from reaching the interior of the residence.

Figure 3:
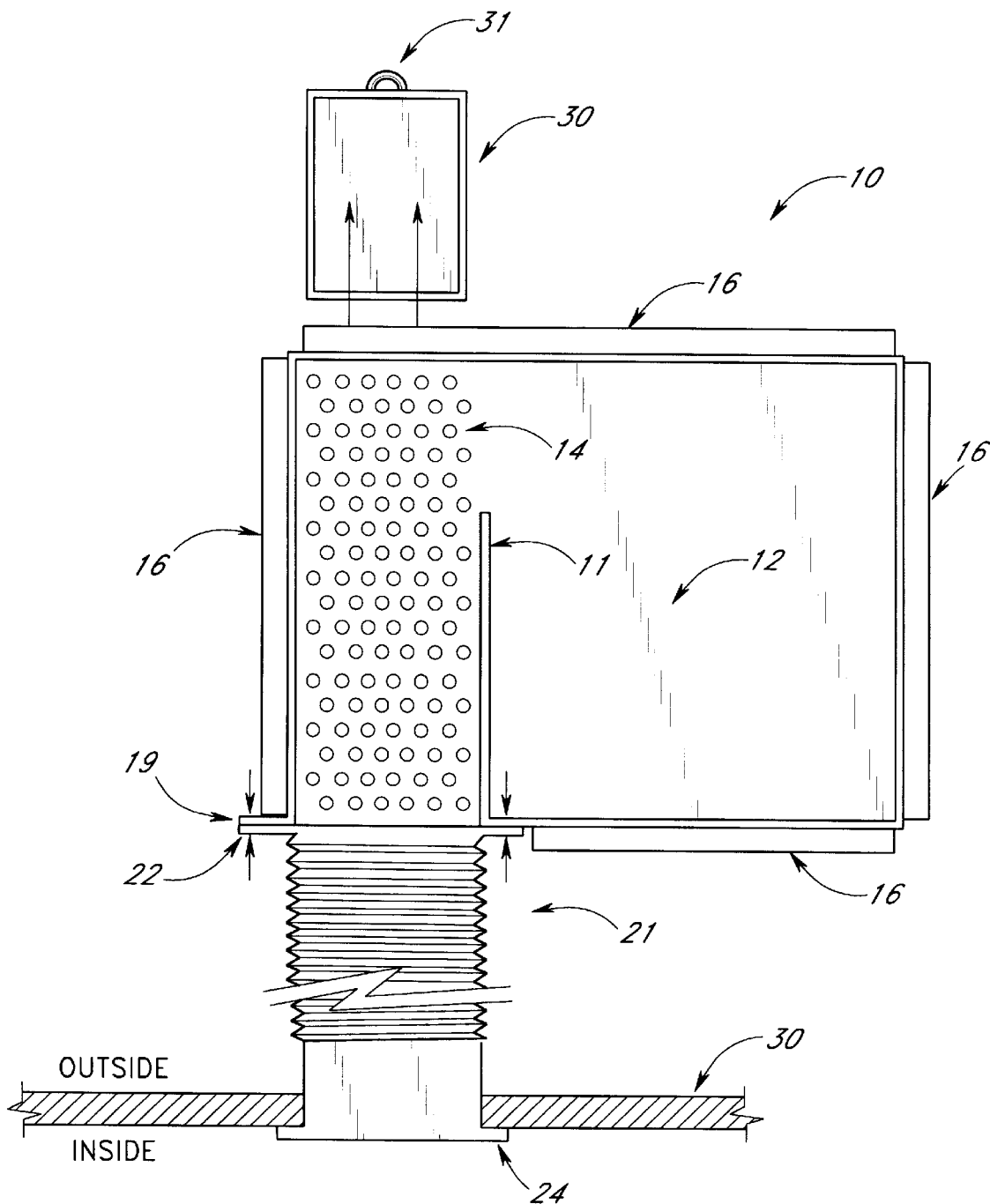
FIG. 3 depicts an overhead view of the interior of a preferred litter box assembly of the invention, in which the lid is not depicted to permit a view of the interior of the assembly.

A preferred mounting of the litter box and tunnel to the residence is illustrated in FIG. 3, showing an overhead view of the entire assembly, which does not specify the orientation of the litter box with respect to the opening in the residence. As can be seen at the bottom of the figure, the tunnel 21 is fitted through an opening in residence boundary 30 (shown in cross-section), and attached to the inside of this opening via flange 24. The device is also provided with hardware, and an interior mounting bracket and an exterior-mounting bracket (not shown) to be used for attaching the rigid portion 28 to the interior and exterior of the opening, respectively. The exterior mounting bracket is preferably shaped to resist the entry of water into the residence as well as the litter box. The interior-mounting bracket would attach to inner flange 24 to frame an opening inside the residence. The interior bracket may also be fitted with an impermeable, flexible vinyl "door" which is capable of being pushed open by the pet upon exit or entry. This door may be removed if the device is used with an existing pet door, or if the user does not desire it for any reason.

Although this invention has been described in terms of a certain preferred embodiment with some minor variables, other embodiments that are apparent to those of ordinary skill in the art are also within the scope of this invention.

What is claimed is:

1. An assembly comprising:
   a litter box for containing litter, having a base and a plurality of rigid side walls, an opening in one of the side walls for ingress and egress of a small animal, and a removable lid atop the side walls; and
   a tunnel having a lengthwise axis and a floor, a first open end and a second open end, and ridged in a direction perpendicular to the lengthwise axis to permit modification of the length of the tunnel and to permit flexing of the tunnel normal to said axis;
   wherein the floor of the tunnel is perforated with a plurality of floor holes, said holes being of a size sufficient to allow litter to pass through, and being of a size insufficient to allow a small animal to pass through.

2. The assembly of claim 1, wherein said litter box comprises:
   a waste chamber for containing litter, and an interior wall separating said waste chamber from an interior passageway having a first end and a second end,
   wherein the first end of the interior passageway opens into the waste chamber, and a second end of the interior passageway opens into the tunnel.

3. The assembly of claim 2, wherein one or more of the floor holes is substantially circular.

4. The assembly of claim 3, wherein the floor holes have a diameter ranging from approximately one eighth of one inch to approximately one half of one inch.

5. The assembly of claim 3, wherein at least one of the floor holes has a diameter of approximately one quarter of one inch.

6. The assembly of claim 2, wherein the floor holes are of a substantially uniform diameter.

7. The assembly of claim 2, further comprising a tray that is removably, horizontally affixed below a floor hole of the interior passageway.

8. The assembly of claim 1, wherein at least one of the rigid side walls comprises means for ventilation of the litter box.

9. The assembly of claim 1, wherein the rigid side walls comprise two or more layers of wall holes, said wall holes being of a size to permit the free flow of air and gases into and out of the litter box, and being of a size insufficient to permit passage of the animal from the litter box.

10. The assembly of claim 9, wherein the wall holes are circular and are of a substantially uniform diameter.

11. The assembly of claim 9, wherein the wall holes have diameters greater than approximately one half of one inch and less than approximately two and one half inches.

12. The assembly of claim 9, wherein at least one of the wall holes has a diameter of approximately one and one-half inch.

13. The assembly of claim 9, wherein the rigid walls comprise overhanging material above one or more of the wall holes to retard water from entering said wall holes.

14. The assembly of claim 9, further comprising at least one mesh screen placed over at least one of the wall holes.

15. The assembly of claim 1, wherein the waste chamber is constructed of plastic.

16. A method of attaching the assembly of claim 1 to an opening in a residence comprising:
   moving the litter box to a predetermined orientation and location with respect to the opening in the residence;
   modifying the length and orientation of the tunnel; and
   affixing the first opening of the tunnel to a opening in the litter box; and
   affixing the second opening of the tunnel to the opening of the residence.

17. An assembly, comprising:
   a litter containing compartment having rigid side walls and an access opening;
   a tunnel removably connected to said access opening, said tunnel having a lengthwise axis and a floor, a first open end and a second open end, and ridged in a direction perpendicular to the lengthwise axis to permit modification of the length of the tunnel and to permit flexing of the tunnel normal to said axis;
   wherein the floor of the tunnel is perforated with a plurality of floor holes, said holes being of a size sufficient to allow litter to pass through, and being of a size insufficient to allow a small animal to pass through; and
   wherein said tunnel supports the weight of a small animal.

18. The assembly of claim 17, wherein the tunnel is made of accordion plastic.

19. An apparatus for connecting a litter box to a residence opening for purposes of the ingress and egress of a small animal, comprising:
   a tunnel having a lengthwise axis and a floor, a first open end and a second open end, and ridged in a direction perpendicular to the lengthwise axis to permit modification of the length of the tunnel and to permit flexing of the tunnel normal to said axis;
   means for removably affixing said first open end to an opening in a residence; and
   means for removably affixing said second open end to an opening in a litter box;
   wherein the floor of the tunnel is perforated with a plurality of floor holes, said holes being of a size sufficient to allow litter to pass through, and being of a size insufficient to allow a small animal to pass through.

20. The apparatus of claim 19 wherein the means for removably affixing said first open end to an opening in a residence and the means for removably affixing said second open end to an opening in a litter box each comprise at least one rigid bracket.

21. The apparatus of claim 19, wherein the means for removably affixing said first open end to an opening in a residence comprise a rigid baffle that, together with the tunnel prevents access to the opening of the residence other than through the tunnel.

22. The apparatus of claim 19, wherein the floor holes are of a substantially uniform size.

23. A kit comprising:
   a waste chamber having a base, a plurality of rigid side walls, an access opening in one side wall, and a removable lid;
   a tunnel for connecting said litter box to a residence opening, said tunnel having a lengthwise axis and a floor, a first open end and a second open end, and ridged in a direction perpendicular to the lengthwise axis to permit modification of the length of the tunnel and to permit flexing of the tunnel normal to said axis, wherein the floor of the tunnel is perforated with a plurality of floor holes, said holes being of a size sufficient to allow litter to pass through, and being of a size insufficient to allow a small animal to pass through;
   means for removably connecting said litter box to said tunnel; and
   means for removably connecting said tunnel to said residence opening.

* * * * *

UNITED STATES PATENT AND TRADEMARK OFFICE
CERTIFICATE OF CORRECTION

PATENT NO.    : 6,237,534 B1                                        Page 1 of 1
DATED         : May 29, 2001
INVENTOR(S)   : David Schwartz It is certified that error appears in the above-identified patent and that said Letters Patent is hereby corrected as shown below:

<u>Column 9,</u>
Line 20, please change "constructed of plastic" to -- constructed of a plastic. --

Signed and Sealed this

Eighth Day of April, 2003

JAMES E. ROGAN
*Director of the United States Patent and Trademark Office*